US008515137B2

(12) United States Patent
Richards et al.

(10) Patent No.: US 8,515,137 B2
(45) Date of Patent: Aug. 20, 2013

(54) GENERATING A COMBINED IMAGE FROM MULTIPLE IMAGES

(75) Inventors: Eric J. Richards, Redmond, WA (US); Roger A. Bischoff, Bellevue, WA (US); Timothy R. O'Connor, Kirkland, WA (US); Tomasz S. M. Kasperkiewicz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 625 days.

(21) Appl. No.: 12/772,772

(22) Filed: May 3, 2010

(65) Prior Publication Data
US 2011/0268369 A1 Nov. 3, 2011

(51) Int. Cl.
*G06K 9/00* (2006.01)
*G06K 9/36* (2006.01)
*G06K 9/20* (2006.01)

(52) U.S. Cl.
USPC .......................................... 382/118; 382/284

(58) Field of Classification Search
USPC ................. 382/100, 118, 284; 345/629–641; 348/584–601
See application file for complete search history.

(56) References Cited

U.S. PATENT DOCUMENTS

| 6,137,498 | A | 10/2000 | Silvers |
| 6,249,616 | B1 | 6/2001 | Hashimoto |
| 6,816,847 | B1 | 11/2004 | Toyama |
| 7,200,247 | B2 * | 4/2007 | Ohba ............................ 382/103 |
| 7,519,907 | B2 | 4/2009 | Cohen et al. |
| 7,576,755 | B2 | 8/2009 | Sun et al. |
| 7,999,843 | B2 * | 8/2011 | Ohba et al. ........................ 348/41 |
| 8,200,039 | B2 * | 6/2012 | Jin et al. ......................... 382/284 |
| 2003/0002707 | A1 * | 1/2003 | Reed et al. ..................... 382/100 |
| 2007/0237421 | A1 | 10/2007 | Luo et al. |
| 2007/0279485 | A1 * | 12/2007 | Ohba et al. ........................ 348/41 |

FOREIGN PATENT DOCUMENTS

| KR | 1019970004114 B1 | 3/1997 |
| KR | 1020080067934 A | 7/2008 |
| WO | 2006100623 A1 | 9/2006 |
| WO | 2007016301 A2 | 2/2007 |

OTHER PUBLICATIONS

Chastain, Sue., "Photonnerge Group Shot", Retrieved at <<http://graphicssoft.about.com/od/pselennents/ig/PSE6New/PSE6-Photomerge-Group-Shot-.htm >>, Retrieved Date: Jan. 7, 2010, pp. 2.

(Continued)

*Primary Examiner* — Shefali Goradia
(74) *Attorney, Agent, or Firm* — Wolfe-SBMC

(57) ABSTRACT

A determination is made for each of multiple regions in multiple images of how good that region is perceived as being. A base image is identified, and a combined image is generated from the multiple images by automatically replacing each region of the base image with a corresponding region of another image if the corresponding region has been determined as being better than the region of the base image. The generating of the combined image can include automatically selecting from one of the multiple images a region in which an object that is present in one or more corresponding regions of other images is absent. Additionally, for a particular region of the base image, corresponding regions of the other images can be displayed, and the particular region replaced with a user-selected one of the corresponding regions of the other images.

20 Claims, 8 Drawing Sheets

(56) References Cited

OTHER PUBLICATIONS

Bitouk, et al., "Face Swapping: Automatically Replacing Faces in Photographs", Retrieved at <<http://graphics.tu-bs.de/teaching/seminars/ws0809/CG/studentwebsites/AndreaKeil/ >>, International Conference on Computer Graphics and Interactive Techniques, ACM SIGGRAPH 2008 papers, Aug. 11-15, 2008, pp. 6.

Haeberli, et al., "Automatic Panoramic Image Merging", Retrieved at <<http://www.graficaobscura.com/merge/index.html >>, Retrieved Date: Jan. 7, 2010, pp. 2.

Agarwala, et al., "Interactive Digital Photomontage", Retrieved at <<http://grail.cs.washington.edu/projects/photomontage/photomontage.pdf >>, ACM Transactions on Graphics (TOG), Proceedings of ACM SIGGRAPH 2004, vol. 23, No. 3, Aug. 2004, pp. 1-9.

Rother, Carsten et al., ""GrabCut"—Interactive Foreground Extraction using Iterated Graph Cuts", ACM SIGGRAPH 2004, (2004),6 pages.

Criminisi, A. "Region Filling and Object Removal by Exemplar-Based Image Inpainting", IEEE Transactions on Image Processing, vol. 13, No. 9, (Sep. 2004),pp. 1-13.

"International Search Report", Mailed Date: May 31, 2011, Application No. PCT/US2010/049003, Filed Date: Sep. 15, 2010, pp. 10.

* cited by examiner

GENERATING A COMBINED IMAGE FROM MULTIPLE IMAGES

BACKGROUND

Users frequently take pictures of groups of objects, such as groups of people (e.g., family members or friends), groups of animals (e.g., pets), and so forth. Unfortunately, it is oftentimes difficult to get all of the objects in an acceptable position or pose at the time the picture is taken. For example, for a group of people, when the picture is taken one or more people may be blinking, frowning, looking away from the camera, and so forth. It can also be difficult to get all of the objects in the picture without other extraneous objects being present, such as additional people walking through the picture. These difficulties can lead to situations where users do not get the pictures they desire, and can result in user frustration when trying to take pictures.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, multiple images that each include multiple objects are accessed. A determination is made for each of multiple regions in the multiple images, of how good that region is perceived as being. A combined image is generated from the multiple images based on the determinations of how good corresponding ones of the multiple regions in the multiple images are perceived as being. The generating of the combined image includes automatically selecting, for inclusion in the combined image, a region from one of the multiple images in which an object that is present in one or more corresponding regions of other images of the multiple images is absent.

In accordance with one or more aspects, multiple images that each include multiple objects are accessed. A determination is made, for each of multiple regions in the multiple images, of how good that region is perceived as being. A base image of the multiple images is identified, which can be the image having the most regions determined as being perceived as the "best" regions. A combined image is generated from the multiple images by automatically replacing each region of the base image with a corresponding region of another image of the multiple images if the corresponding region has been determined as being better than the region of the base image. Additionally, regions of each of the other images of the multiple images are displayed, with each of the regions corresponding to a particular region of the base image. A user selection of one of the corresponding regions of the other images of the multiple images is received, and the particular region of the base image is replaced with the user-selected one of the corresponding regions of the other images.

BRIEF DESCRIPTION OF THE DRAWINGS

The same numbers are used throughout the drawings to reference like features.

DETAILED DESCRIPTION

Generating a combined image from multiple images is discussed herein. Multiple images of the same scene are captured, and although the images are of the same scene there can be differences between the images. Different regions within those images are identified and determinations are made for each of the different regions of how good the region is perceived as being (e.g., if the region represents a face, whether people are smiling, whether people have their eyes open, etc). The determinations of how good the region is perceived as being can be made by an evaluation module based on various characteristics of the region. A base image of the multiple images is selected, typically by selecting the image having the most regions that will not be replaced by a corresponding region from the other of the multiple regions. When a region of another of the multiple regions is determined to be perceived as better than the corresponding region of the base image, that region in the base image can be automatically replaced by the corresponding region from the other of the multiple regions.

A user interface can also be displayed to the user for a particular region in the base image, displaying to the user the corresponding regions of the other of the multiple images and allowing the user to select one of those corresponding regions that is to replace the region in the base image. Additionally, situations where an object is present in a region of the base image, but is not present in corresponding regions of one or more other of the multiple images (such as when a person is walking through the background of a scene) can be identified. In such situations, the region without the object present can optionally be automatically selected as the region to replace the corresponding region in the base image.

Figure 1:
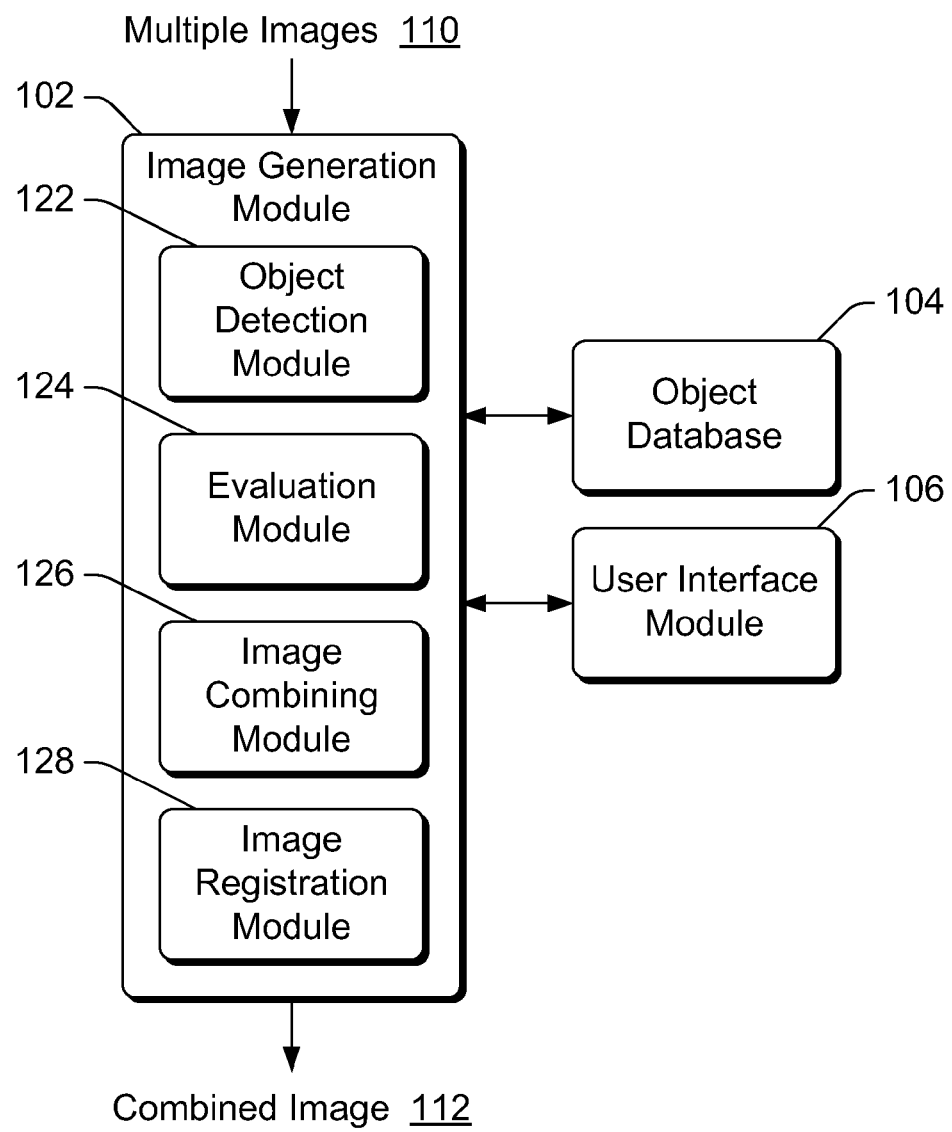
FIG. 1 illustrates an example system implementing the generating a combined image from multiple images in accordance with one or more embodiments.

FIG. 1 illustrates an example system 100 implementing the generating a combined image from multiple images in accordance with one or more embodiments. System 100 can be implemented as part of one or more of a variety of different types of devices, such as a desktop computer, a mobile station, a kiosk, an entertainment appliance, a set-top box communicatively coupled to a display device, a television, a cellular or other wireless phone, a camera, a camcorder, an audio/video playback device, a game console, an automotive computer, and so forth. Alternatively, system 100 can be implemented across multiple devices of the same or different types. Such multiple devices can be coupled to one another in a variety of different manners, such as via a wired or wireless connection (e.g., a Universal Serial Bus (USB) connection, a wireless USB connection, a connection in accordance with the IEEE 1394 standard, etc.), or via a network (e.g., the Internet, a local area network (LAN), a cellular or other phone network, etc.), and so forth.

System 100 includes an image generation module 102, an object database 104, and a user interface module 106. Module 102, database 104, and module 106 can be implemented as part of the same, or alternatively different, devices. Image generation module 102 receives multiple images 110 and generates a combined image 112 by selecting different regions from different ones of the multiple images 110. Object database 104 is a record of objects that are recognized by or otherwise known to system 100. Object database 104 can be, for example, a record of different faces and associated names that are known to system 100. Object database 104 can include multiple images with objects being identified in each of these multiple images and database 104. For example, object database 104 can be a digital photo album (e.g., maintained by an online service) including multiple different images in which people have been identified (with the same and/or different people being identified in different ones of these images). This record of objects can be maintained using a variety of different data structures or storage techniques. User interface (UI) module 106 manages presentation of information to a user of system 100 and receipt of requests from a user of system 100.

Images 110 can be obtained by image generation module 102 in a variety of different manners. Images 110 can be captured by a device including module 102, can be provided to module 102, can be stored in a location identified to module 102 from which module 102 retrieves images 110, and so forth. For example, image generation module 102 can be implemented as part of an Internet service to which a user uploads or otherwise transfer images 110. By way of another example, image generation module 102 can be implemented as part of a digital camera that captures images 110. By way of yet another example, image generation module 102 can be implemented as an in-store kiosk that retrieves images from a memory device coupled to the kiosk.

Image generation module 102 includes an object detection module 122, an evaluation module 124, an image combining module 126, and an image registration module 128. The operation of modules 122, 124, 126, and 128 are discussed generally here, and in more detail below. Generally, object detection module 122 detects regions within the images 110. Evaluation module 124 makes a determination for each of these regions of how good the region is perceived as being. These determinations can be made in a variety of different manners as discussed in more detail below. Based on these determinations, image combining module 126 selects one of the multiple images 110 to be a base image and then automatically selects different regions of other images of the multiple images 110 to replace corresponding regions of the base image in order to generate combined image 112. For a given region, typically the corresponding region determined as being perceived as the "best" region is the region that is included in combined image 112. Image registration module 128 is optionally included in image generation module 102, and when included determines how images map to one another. This mapping refers to which portions of images are regions that correspond to one another.

Regions typically, but not always, include objects. Image combining module 126 can automatically select a corresponding region of another image that includes no object, even though the base image may include the object. Thus, an object in the base image can be deleted or removed from a scene and not included in combined image 112. Additionally, user interface module 106 can allow a user to override the automatic selections made by image combining module 126 as discussed in more detail below.

Object detection module 122 can be configured to detect a variety of different types of objects within regions of images 110. These types of objects can be, for example, people (or faces of people) and/or animals (e.g., pets). Alternatively, other objects can be detected, such as buildings, landscaping or other geographic features, cars or other vehicles, items or human organs (e.g., on x-ray images), and so forth. Object detection module 122 is typically configured to detect one type of object, although alternatively can be configured to detect any number of different types of objects.

Multiple images 110 received by image generation module 102 are typically of the same scene, such as multiple images of a group of people at a wedding or family reunion. In one or more embodiments, object detection module 122 can detect whether one or more of the multiple images 110 are not of the same scene. Images that are detected as not being of the same scene are automatically removed and not considered by image generation module 102 as included in the multiple images 110. Whether images are of the same scene can be determined in a variety of different manners. For example, two images having at least a threshold number of the same objects can be determined as being of the same scene. This threshold number can be a fixed number (e.g., 5 or more of the same objects) or a relative number (e.g., 60% or more of the objects in the images are in both images). By way of another example, a user of system 100 can provide input indicating which images are of the same scene. Thus, even though two images may be of the same scene, the two images need not be (and typically are not) identical.

In one or more embodiments, image registration module 128 determines which images are of the same scene. Image registration module 128 uses a registration technique to determine how images map to each other spatially. If two images map to one another well enough (e.g., at least a threshold number of matching features are included in each of the images), then the two images are determined to be of the same scene. Matching features can be identified using a variety of different conventional techniques, such as using a scale-invariant feature transform (SIFT) algorithm.

Even though images 110 are of the same scene, the objects within the scene can be different. For example, an unknown person can be walking behind a group of people and thus appear in different locations in different images 110. By way of another example, one person in the group of people may move and thus be in different locations in different images 110. By way of yet another example, people may move their heads, talk, blink, etc., and thus be in different locations or poses in different images 110.

Object detection module 122 also aligns the multiple images 110. Aligning the multiple images 110 refers to identifying different regions of the images 110 that correspond to one another (e.g., include the same object). As part of this alignment process, for each of the multiple images 110 object detection module 122 identifies objects within the image, identifies a region of the image that includes that object, and also identifies, for a region that is identified in one image, corresponding regions in different images 110. These corresponding regions in different images 110 are typically in approximately the same location of the scene. Accordingly, when object detection module 122 identifies a region in one image, module 122 also identifies corresponding regions in the same location of the scene in the other images. These corresponding regions can, but need not, include the same objects. For example, as discussed in more detail below, one region may include an object (e.g., a person walking behind a group of people) that is absent from a corresponding region of another image.

Corresponding regions in different images 110 can be determined in different manners. For example, image registration module 128 can use a registration technique to determine how images map to each other spatially. Matching features in images 110 are identified, and the locations of those features in the images 110 are identified. Particular objects (e.g., faces) within those matching features are identified, and regions that surround those particular objects are identified.

In one or more embodiments, the identification of regions in images 110 is based at least in part on object recognition. Object database 104 is a record of objects that are recognized by or otherwise known to system 100. Object database 104 can be generated in a variety of different manners, such as based on input from a user of system 100 identifying particular objects (e.g., tagging objects in their digital photo album), information identifying particular objects obtained from other components or devices, and so forth. Object detection module 122 uses the information in object database 104 to automatically detect known objects (objects known to system 100) in images 110. The presence of these known objects in particular locations in images 110 can then be used to identify a region around the detected objects.

In alternate embodiments, object detection module 122 can operate without object database 104. In such embodiments, object detection module 122 detects particular objects within images 110, and also detects when an object in one image 110 is the same as an object in another of the images 110. Although object detection module 122 may not be identifying known objects in such embodiments, object detection module 122 can still detect when objects in multiple images are the same.

The detection of objects in images can be performed in a variety of different conventional manners. It is to be appreciated that the manner in which objects are detected in images can vary based on the particular objects being detected. For example, different techniques can be used to detect human faces than are used to detect animal faces or other objects.

The aligning of the multiple images and the identification of regions around objects (including the identification of seams along which the region can be "cut" for removal or copying from an image, and the joining or pasting of one region into another image) can be performed in a variety of different conventional manners. In one or more embodiments, the aligning of the multiple images and the identification of regions around objects are performed using a photomontage technique for splicing regions of images together discussed in more detail in A. Agarwala, et al., "Interactive Digital Photomontage", ACM SIGGRAPH 2004. In one or more embodiments, the splicing of a region from one image into another is performed using automatic selection and blending techniques. An example of an automatic selection technique is discussed in more detail in C. Rother, et al., "GrabCut: Interactive Foreground Extraction Using Iterated Graph Cuts", ACM SIGGRAPH 2004, and an example of a blending technique is discussed in more detail in A. Criminisi, et al., "Region Filling and Object Removal by Exemplar-Based Inpainting", IEEE Transactions on Image Processing, vol. 13, no. 9, pp 1200-1212, January 2004.

Figure 2:
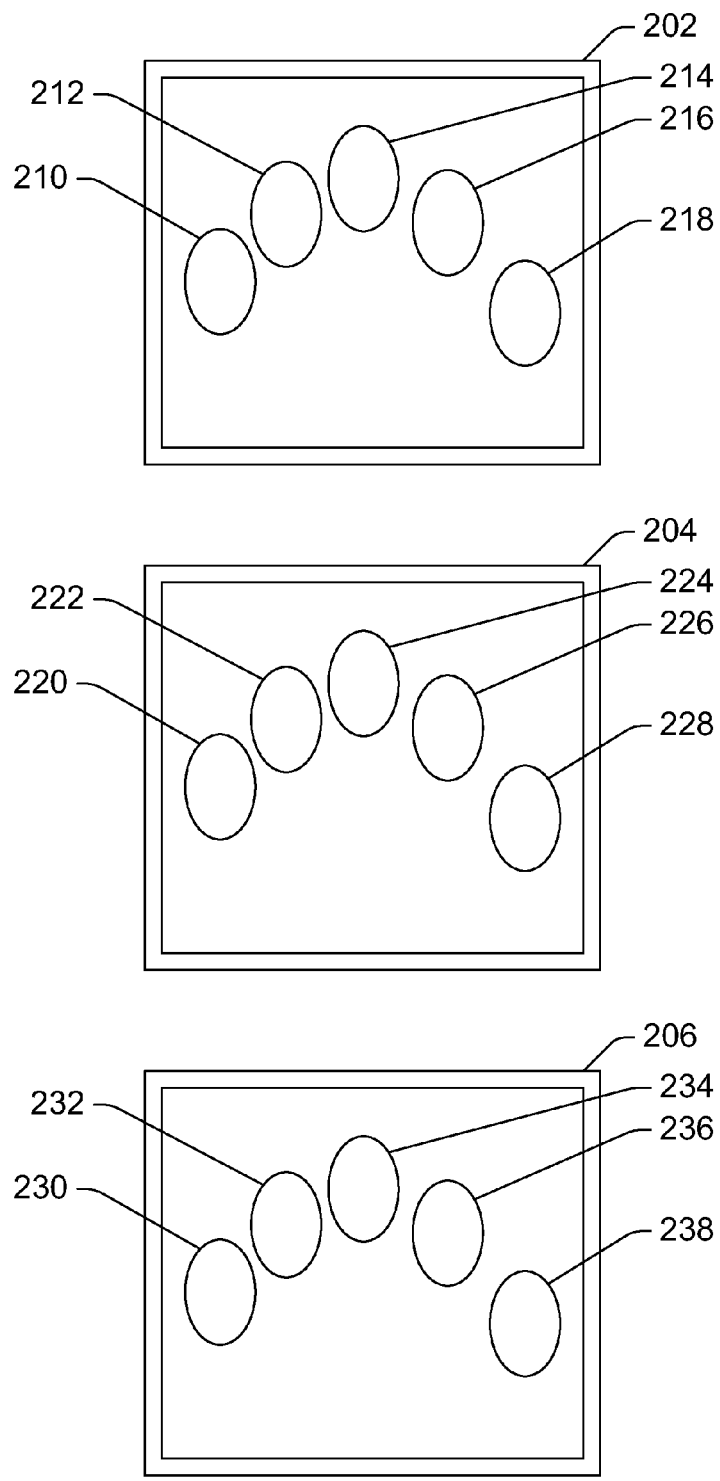
FIG. 2 shows an example of multiple images of the same scene in accordance with one or more embodiments.

FIG. 2 shows an example of multiple images of the same scene in accordance with one or more embodiments. FIG. 2 illustrates three images 202, 204, and 206 of the same scene that are, for example, multiple images 110 of FIG. 1. Although only three images are illustrated in the example of FIG. 2, it is to be appreciated that any number of images can be used with the techniques discussed herein.

Each of the images 202, 204, and 206 includes multiple regions illustrated as ovals, although it is to be appreciated that a region can be any shape. Each of these regions is illustrated as being the same size, although it is to be appreciated that regions can be different sizes. Each of these regions can include an object as discussed above. Each image 202, 204, and 206 is illustrated as including five regions, although it is to be appreciated that any number of regions can be included in an image.

Image 202 includes regions 210, 212, 214, 216, and 218. Image 204 includes regions 220, 222, 224, 226, and 228. Image 206 includes regions 230, 232, 234, 236, and 238. Different regions in different images that are at approximately the same location are corresponding regions. For example, regions 210, 220, and 230 are corresponding regions. By way of another example, regions 214 and 224 are corresponding regions.

Returning to FIG. 1, evaluation module 124 analyzes the images 110, making a determination of how good each region of the images 110 is perceived, by evaluation module 124, as being. Based on these determinations, one of multiple corresponding regions can be readily be determined as the "best" region of the multiple corresponding regions. Evaluation module 124 can make a determination of how good a region of an image is using a variety of different rules or criteria, and can generate a value reflecting this determination. The value generated by evaluation module 124 can be, for example, a score for a region that indicates how good module 124 perceives the region as being to be compared to other regions, a ranking for a region that indicates how good module 124 perceives the region as being compared to other regions, and so forth. Of multiple corresponding regions, the region having the "best" (e.g., highest) value can be selected as the "best" region of the multiple corresponding regions.

In embodiments where evaluation module 124 generates a score for a region that indicates how good the region is perceived as being, typically regions with higher scores (e.g., larger numerical values) are perceived as being better than regions with lower scores (e.g., smaller numerical values). The score can be determined in a variety of different manners. In one or more embodiments the score is determined by evaluating one or more of various characteristics of the region. Evaluation module 124 is configured with or otherwise has access to weights associated with the various characteristics that affect the scores of the regions, with some characteristics being associated with higher weights than other characteristics. Different characteristics in a region can increase the score of the region or decrease the score of the region (e.g., depending on the weights of the particular characteristic). In other embodiments, the score is determined based on a learning process in which a component or module (such as evaluation module 124) automatically learns which attributes of a region are to be given higher scores. For example, a neural net, decision tree, or other learning machine can be used to learn, based on user feedback of regions that the user identifies as good or bad, the characteristics of the regions that the user identifies as good and the characteristics of the regions that the user identifies as bad. This neural net, decision tree, or other learning machine can then be used to assign scores to the different regions in the images.

Alternatively, a determination of how good a region is perceived as being by evaluation module 124 can be made by comparing multiple corresponding regions, such as by using a neural net, decision tree, or other learning machine. This comparison can be based on evaluating one or more of a variety of different characteristics of a region. Based on this comparison, one of the multiple corresponding regions is selected as being perceived as the "best" region of the multiple corresponding regions. The one of the multiple corresponding regions that is perceived as the "best" of the multiple corresponding regions can optionally be determined automatically using a neural net, decision tree, or other learning machine. A ranking can be assigned to these regions (e.g., ranking the regions in order from the region perceived as "best" to the region perceived as "worst"). Alternatively, a score can be assigned to these regions (e.g., values of "best" or "not best"), or one of the regions can be flagged or otherwise identified as being perceived as the "best" region of the multiple regions.

In embodiments in which the determination of how good a region is perceived as being is made by evaluating one or more characteristics of a region, these characteristics can include characteristics of an object within the region and/or other characteristics of the region. Following is a list of several different characteristics that can be used by evaluation module 124 in determining how good a region is perceived as being. These characteristics are: object is tagged with commonly used tag, object is tagged, object rectangle or region has been drawn or confirmed by user, object recognition has a high confidence suggestion, object detector has found an object present, eye data is perceived as good, smile data is perceived as good, image is underexposed, image is overexposed, and object is blurry. It is to be appreciated that these characteristics are examples, and that other characteristics can alternatively be used.

Object is Tagged with Commonly Used Tag.

The region includes an object that has been identified as a known object (based on object database 104) and is a commonly tagged object. A tagged object is an object the identity of which has been identified by a user of system 100. The identity of the object can be maintained as part of the image that includes the region (e.g., in metadata associated with the image) or alternatively separately (e.g., in a separate record or database). A commonly tagged object is an object the identity of which has been frequently identified by a user of system 100 in the same or different images. This frequency can be determined based on a fixed value (e.g., the object has been identified five times in five different images by a user, or the object is one of the top five most frequently identified objects) or on a relative value (e.g., the object has been identified by a user more often than 90% of the other objects in object database 104). For example, if object database 104 includes multiple images of people, a user of system 100 can tag people in those images by identifying (e.g., by name) those people. People in the images of object database 104 that are tagged more frequently than other people in the images are commonly tag objects.

Object is Tagged.

The region includes an object that is a tagged object. A tagged object is an object the identity of which has been identified by a user of system 100. A tagged object is similar to a commonly tagged object, except that the object has not been frequently identified by user of system 100.

Object Rectangle or Region has been Drawn or Confirmed by User.

The region includes a rectangle or other geometric shape around an object. A rectangle or other shape can be drawn around an object by a user of system 100. Such a rectangle or other shape can be drawn in different manners, such as system 100 displaying an image 110 that includes the object and receiving via a user interface an indication of the rectangle or other shape (e.g., via a pointer, via a finger or stylus on a touchscreen, and so forth). Alternatively, a rectangle or other shape can be automatically drawn around an object by another component or module, and the location of that rectangle or other shape confirmed by a user of system 100. The rectangle or other shape drawn around an object indicates that an object is present within that rectangle or other shape, although the identity of the object has not yet been identified by a user system 100.

Object Recognition has a High Confidence Suggestion.

The region includes an object that has been automatically identified with a high probability of accuracy. Such an object is identified by a particular component or module rather than by a user of system 100. The object can be identified by object detection module 122 or alternatively another component or module. The high probability of accuracy can be identified in different manners, such as based on a fixed value (e.g., at least a 95% probability of accuracy) or a relative value (e.g., a higher probability than 80% of the other objects detected by the component module).

Object Detector has Found an Object Present.

The region includes an object that has been automatically identified by a particular component or module rather than by a user of system 100. The object may be identifiable by object detection module 122 or alternatively another component or module.

Eye Data is Perceived as Good.

In embodiments where the object includes a face, a value representing how good the eyes in each face are perceived as being can be generated. This value can reflect, for example, whether eyes are detected as being present in each face (e.g., as opposed to being obscured from view due to a head being turned or a hand covering the eyes), whether eyes are detected as being open (e.g., as opposed to closed due to blinking), whether there is well-defined catchlight in the eye, and so forth. A variety of different conventional techniques can be employed to detect eyes within a face, determine whether eyes are open, identify catchlight in eyes and so forth. The value can be generated, for example, by assigning a larger number if open eyes without catchlight are detected in a face, a smaller value if open eyes with catchlight are detected in a face, an even smaller value if closed eyes are detected in a face, and so forth. A larger number can alternatively be assigned if a catchlight that enhances the image is detected in a face (e.g., based on whether the orientation of the catchlight in the eyes matches the orientation of the catchlights in the eyes of other faces (in other regions) in the image), and a smaller number assigned if a catchlight that does not enhance the image is detected in a face. Alternatively, a ranking or value indicating how good the eyes in a face are perceived as being can be determined by a learning process (such as a neural net, decision tree, or other learning machine) that automatically learns what attributes of a face indicate how good eyes are (e.g., based on user feedback of what is good).

Smile Data is Perceived as Good.

In embodiments where the object includes a face, a value representing how good the smile in each face is perceived as being can be generated. This value can be generated to indicate, for example, whether a mouth is detected as being present in each face (e.g., as opposed to being obscured from view due to a head being turned or a hand covering the mouth), whether a smile is detected as being present (e.g., as opposed to a frown being present or a tongue sticking out), and so forth. A variety of different conventional techniques can be employed to detect whether a mouth is present in a face, whether a smile is present within a face, and so forth. The value can be generated, for example, by assigning a larger number if a smile is detected in a face, a smaller value if a closed mouth is detected in a face, an even smaller value if no mouth is detected in a face, and so forth. Alternatively, a ranking or value indicating how good the smile in a face is perceived as being can be determined by a learning process (such as a neural net, decision tree, or other learning machine) that automatically learns what attributes of a face indicate how good a smile is (e.g., based on user feedback of what is good).

Image is Underexposed.

The image is determined to be underexposed. This determination can be made based on the entire image, based on all regions in the image, or on a region by region basis. Whether the image is underexposed can be determined in different matters, such as based on exposure values derived from a histogram of the image or one or more regions of the image. Whether the image is underexposed can also be determined based at least in part on exposure values determined for other of the multiple images 110. For example, an image having an exposure value that is at least a threshold amount less than the exposure values for the other multiple images can be determined to be underexposed. This threshold amount can be a fixed amount (e.g., a particular part of a histogram of the image is less than the same part of the histogram for other images) or a relative amount (e.g., a particular part of a histogram of the image is at least 10% less than the same part of the histogram for other images).

Image is Overexposed.

The image is determined to be overexposed. This determination can be made based on the entire image, based on all regions in the image, or on a region by region basis. Whether the image is overexposed can be determined in different matters, such as based on exposure values derived from a histogram of the image or one or more regions of the image. Whether the image is overexposed can also be determined based at least in part on exposure values determined for other of the multiple images 110. For example, an image having an exposure value that is at least a threshold amount greater than the exposure values for the other multiple images can be determined to be overexposed. This threshold amount can be a fixed amount (e.g., a particular part of a histogram of the image is greater than the same part of the histogram for other images) or a relative amount (e.g., a particular part of a histogram of the image is at least 10% greater than the same part of the histogram for other images).

Object is Blurry.

An object in the region is detected as being blurry. Whether the object is blurry, a degree of blurriness for the object, or a type of blurriness (e.g., depth of field blur, motion blur, camera shake blur, and so forth) can be identified in a variety of different conventional manners.

Each characteristic used by evaluation module 124 (such as those discussed above) has an associated weight, and different characteristics can have different associated weights. For example, the characteristics regarding whether the image is overexposed, whether the image is underexposed, and whether the object is blurry can have lower associated weights than the other characteristics. The weight for a characteristic can be, for example, a particular value (such as a numerical value) or a set of values (e.g., a set of multiple numerical values).

In one or more embodiments, one or more of these weights are used to generate a score for the region. The score is used to identify which region is perceived as being the "best" (e.g., the region having the highest score is perceived as being the "best"). The score for a region can be generated in a variety of different manners. In one or more embodiments, evaluation module 124 generates a characteristic score or value for each characteristic of a region evaluated by module 124 (e.g., a characteristic score indicating whether a region includes an object that has been identified as a known object and is a commonly tagged object, a characteristic score that is a value representing how good the eyes in each face are perceived as being, etc.). These characteristic scores are normalized so that the characteristic scores for the various characteristics evaluated by evaluation module 124 have the same range. For each characteristic evaluated by evaluation module 124, module 124 determines the product of the characteristic score and the weight, and adds these products for the various characteristics that were evaluated together to obtain a score for the region. In other embodiments, the characteristic scores for the various characteristics evaluated are combined (e.g., added together, averaged together, etc.) without being normalized and/or multiplied by a weight to determine a score for the region. In other embodiments, one of these characteristic scores (e.g., the characteristic score that is the largest value) can be selected as the score for the region. In other embodiments, the characteristics can be analyzed in a prioritized order (e.g., by a neural net, decision tree, or other learning machine), and a score for the region assigned based on the characteristics.

Image combining module 126 uses the determinations of how good the regions are perceived as being to select one of the multiple images 110 as a base image. This base image serves as a starting point for the combined image 112 being generated, and can have regions replaced with corresponding regions from other images to generate the combined image 112. In one or more embodiments, an image score is calculated by combining (e.g., adding together, averaging together, etc.) the scores for the regions of the image. The base image is selected as the image having the largest image score. Alternatively, the base image can be identified in different manners, such as selecting the image having the region with the highest score as the base image, selecting the image having the largest number of regions that have been determined to be the "best" regions relative to the corresponding regions of other images, selecting the base image randomly or according to some other rules or criteria, and so forth.

For each region in the base image, image combining module 126 determines whether to keep the region or replace the region with a corresponding region of another of the multiple images. Image combining module 126 makes this determination by automatically selecting the one of the corresponding regions having been determined to be the "best" region (as determined by evaluation module 124 as discussed above). For example, referring to FIG. 2, assume that image 204 is the base image. Image combining module 126 determines which one of corresponding regions 212, 222, and 232 is determined to be the "best" region. If region 222 is determined to be the "best" region, then image combining module 126 keeps region 222 in image 204 to generate the combined image. However, if region 212 or 232 is determined to be the "best" region, then image combining module 126 automatically replaces region 222 in image 204 with the one of region 212 and 232 that is determined to be the "best" region.

It should be noted that a particular region of the base image that includes an object can be automatically replaced by image combining module 126 with a corresponding region of another image from which the object is absent. For example, referring to FIG. 2, assume that image 204 is the base image. Further assume that region 218 and region 228 both include the face of a person that is not recognized as being a known individual, and thus region 218 and region 228 are both assigned a low (possibly negative) score by evaluation module 124. Further assume that the person was walking through the scene as the images were captured, and thus the person is not included in corresponding region 238. Evaluation module 124 can assign region 238 a higher score than regions 218 and 228 because region 238 does not include a face of a person that is not recognized as being a known individual. Thus, region 238 is determined to be the "best" region of corresponding regions 218, 228, and 238. Accordingly, image combining module 126 automatically replaces region 228 in image 204 with region 238 to generate the combined image. By replacing region 228 with region 238, a region in which an object is present (region 228) is automatically replaced by a region in which the object is absent (region 238).

Figure 3:
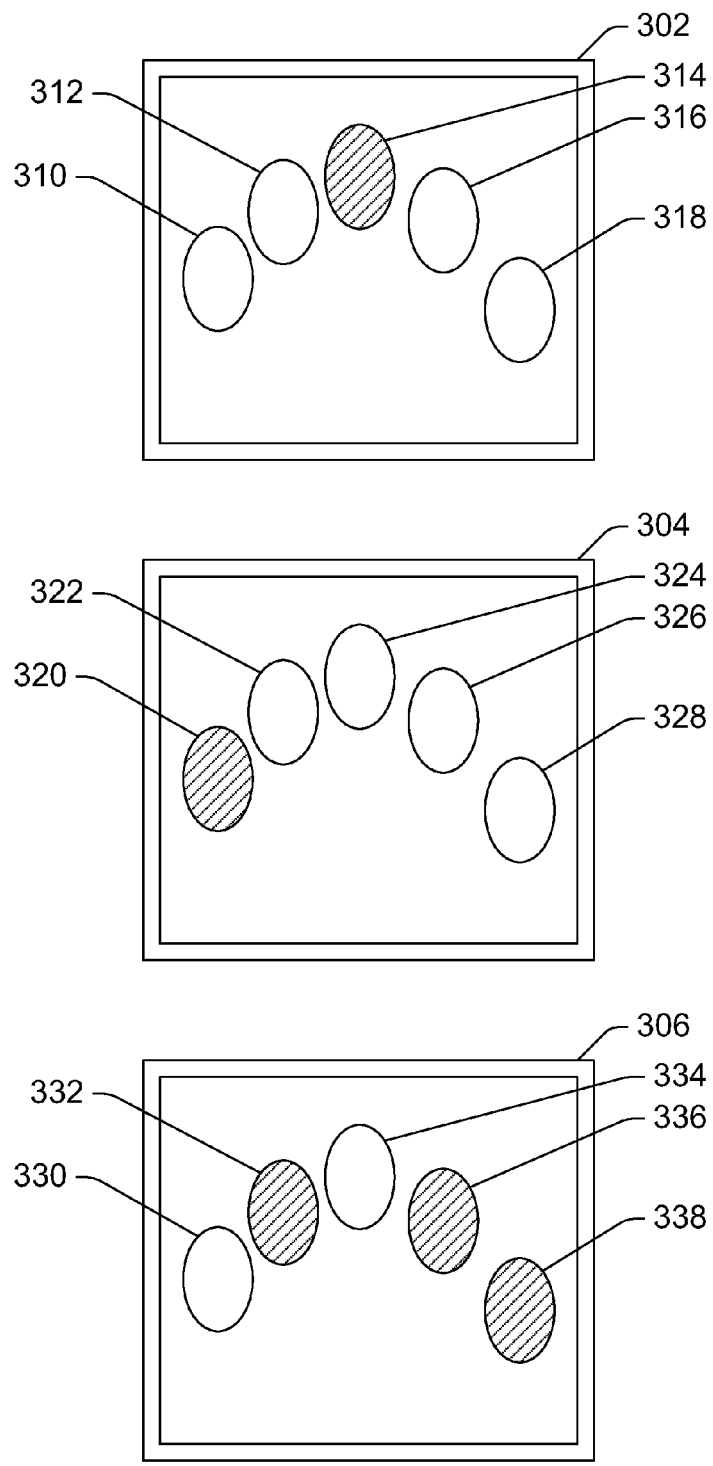
FIG. 3 shows an example of automatically replacing regions in one image with corresponding regions from other images to generate a combined image in accordance with one or more embodiments.

FIG. 3 shows an example of automatically replacing regions in one image with corresponding regions from other images to generate a combined image in accordance with one or more embodiments. FIG. 3 illustrates three images 302, 304, and 306 of the same scene that are, for example, images 202, 204, and 206, respectively, of FIG. 2. Although only three images are illustrated in the example of FIG. 3, it is to be appreciated that any number of images can be used with the techniques discussed herein.

Image 302 includes regions 310, 312, 314, 316, and 318. Image 304 includes regions 320, 322, 324, 326, and 328. Image 306 includes regions 330, 332, 334, 336, and 338. The corresponding regions that are determined to be the "best" region are illustrated in FIG. 3 with cross-hatching. Accordingly, region 320 is determined to be the "best" region of the set of corresponding regions 310, 320, and 330. Similarly, region 332 is determined to be the "best" region of the set of corresponding regions 312, 322, and 332, region 314 is determined to be the "best" region of the set of corresponding regions 314, 324, and 334, region 336 is determined to be the "best" region of the set of corresponding regions 316, 326, and 336, and region 338 is determined to be the "best" region of the set of corresponding regions 318, 328 and 338. In one or more embodiments, image 306 has the largest number of regions that are determined to be the "best" region, and thus image 306 is selected by evaluation module 124 as the base image.

Region 320 is determined to be the "best" region of regions 310, 320, and 330, so image combining module 126 automatically replaces region 330 with region 320 in the combined image. Similarly, region 314 is determined to be the "best" region of regions 314, 324, and 334, so image combining module 126 automatically replaces region 334 with region 314. Region 332 is determined to be the "best" region of regions 312, 322, and 332, so region 332 is kept in the combined image. Similarly, regions 336 and 338 are kept in the combined image as they are determined to be the "best" regions relative to their the corresponding regions of other images.

It should be noted that an image can include areas or portions that are not identified as a region. For example, image 306 includes areas that are not part of regions 330, 332, 334, 336, and 338. For such areas that are not identified as a region, image combining module 126 keeps those areas from the base image and does not replace those areas with areas from another image. Alternatively, such areas can be treated as an additional one or more regions, with evaluation module 124 determining how good such areas are perceived as being and image combining module 126 automatically replacing the area in the base image with the corresponding area of another image based on the determinations.

Figure 4:
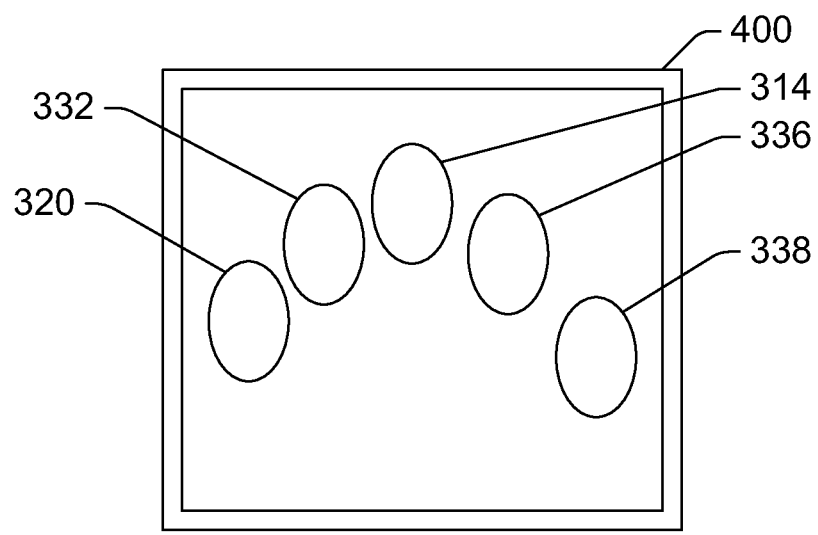
FIG. 4 shows an example of a combined image in accordance with one or more embodiments.

FIG. 4 shows an example of a combined image in accordance with one or more embodiments. FIG. 4 illustrates image 400, which is a combined image generated (e.g., by image combination module 126 of FIG. 1) from the images 302, 304, and 306 of FIG. 3. Image 400 includes regions from the base image, as well as corresponding regions from the other images that have replaced regions in the base image. Following with the discussion of FIG. 3, image 400 includes regions 320, 332, 314, 336, and 338.

Returning to FIG. 1, image combining module 126 automatically selects, based on the determinations of how good the regions are perceived as being by evaluation module 124, regions to be included in the combined image as discussed above. In addition, in one or more embodiments image combining module 126 and UI module 106 allow a user to provide input regarding which one of multiple corresponding regions is to be selected for inclusion in combined image 112. This user input can override the automatic selections made by image combining module 126, or alternatively can be input at different times (e.g., prior to the automatic selection being made by image combining module 126).

UI module 106 generates, manages, and/or outputs a user interface for display. This user interface allows a user to provide input regarding which one of multiple corresponding regions is to be selected. The user interface can be displayed on a screen of the device implementing user interface module 106, or alternatively one or more signals can be generated that are output to one or more other display devices that include a screen on which the user interface can be displayed. A screen can be implemented in a variety of different manners, such as using liquid crystal display (LCD) technology, plasma screen technology, image projection technology, and so forth.

UI module 106 also receives user inputs from a user (e.g., a user of the device implementing UI module 106). User inputs can be provided in a variety of different manners, such as by pressing a particular portion of a touchpad or touchscreen, or by pressing one or more keys of a keypad or keyboard. Touchscreen functionality can be provided using a variety of different technologies. The user input can also be provided in other manners, such as via audible inputs, other physical feedback input to the device (e.g., tapping any portion of a device or another action that can be recognized by a motion detection component of the device, such as shaking the device, rotating the device, etc.), and so forth.

In one or more embodiments, UI module 106 generates a user interface that displays, for a particular region of an image, corresponding regions of each of the other images of the multiple images. These corresponding regions can be displayed in different manners, such as in a menu or window adjacent to the particular region, in a ribbon or other portion of a window, and so forth. The user can provide input via UI module 106 to select one of the other images, in response to which image combining module 126 replaces the region in the combined image with the user-selected image.

Figure 5:
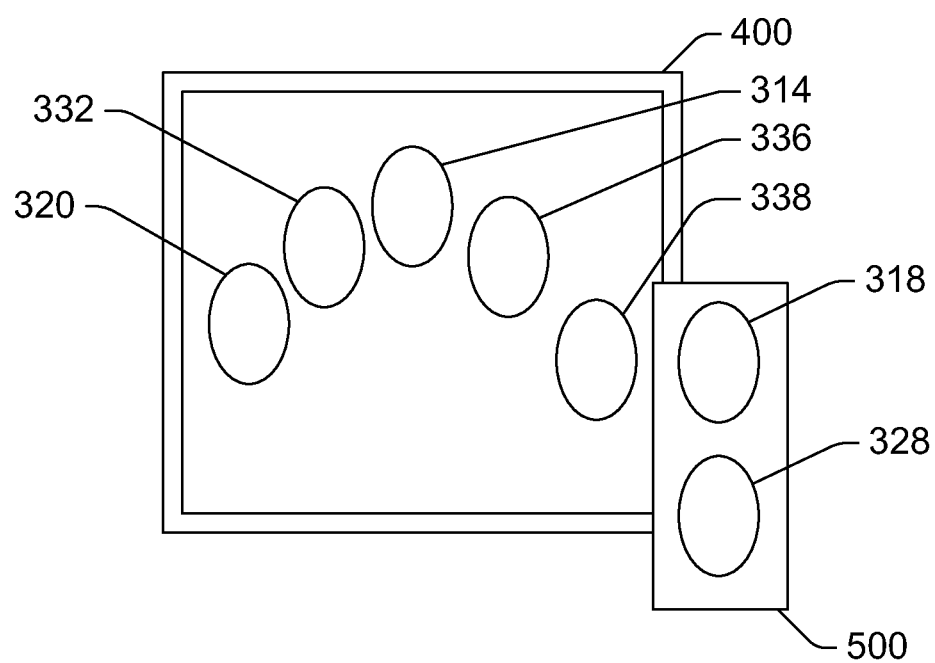
FIG. 5 shows an example of a user interface via which a user can provide input regarding which of multiple corresponding regions is to be selected in accordance with one or more embodiments.

FIG. 5 shows an example of a user interface via which a user can provide input regarding which of multiple corresponding regions is to be selected in accordance with one or more embodiments. FIG. 5 illustrates image 400, which is the same image 400 as illustrated in FIG. 4. In addition, FIG. 5 illustrates a window 500 adjacent to region 338. A user can request that window 500 be displayed by providing a variety of different user inputs (e.g., clicking a particular button of a mouse when a cursor is displayed on top of region 338, selecting a menu option, and so forth).

Window 500 displays regions from other images corresponding to a particular region. In the example illustrated in FIG. 5, window 500 includes regions 318, and 328, which are regions corresponding to region 338. The user can select (by providing an input via UI module 106 of FIG. 1) one of regions 318 and 328, in response to which image combining module 126 of FIG. 1 replaces region 338 with the user-selected one of regions 318 and 328. Thus, it can be seen that the other regions which could replace the automatically selected region 338 can be displayed to the user, and the user can select one of these other regions to replace the automatically selected region 338. The user can thus easily replace a particular region if he or she prefers a different region.

Figure 6:
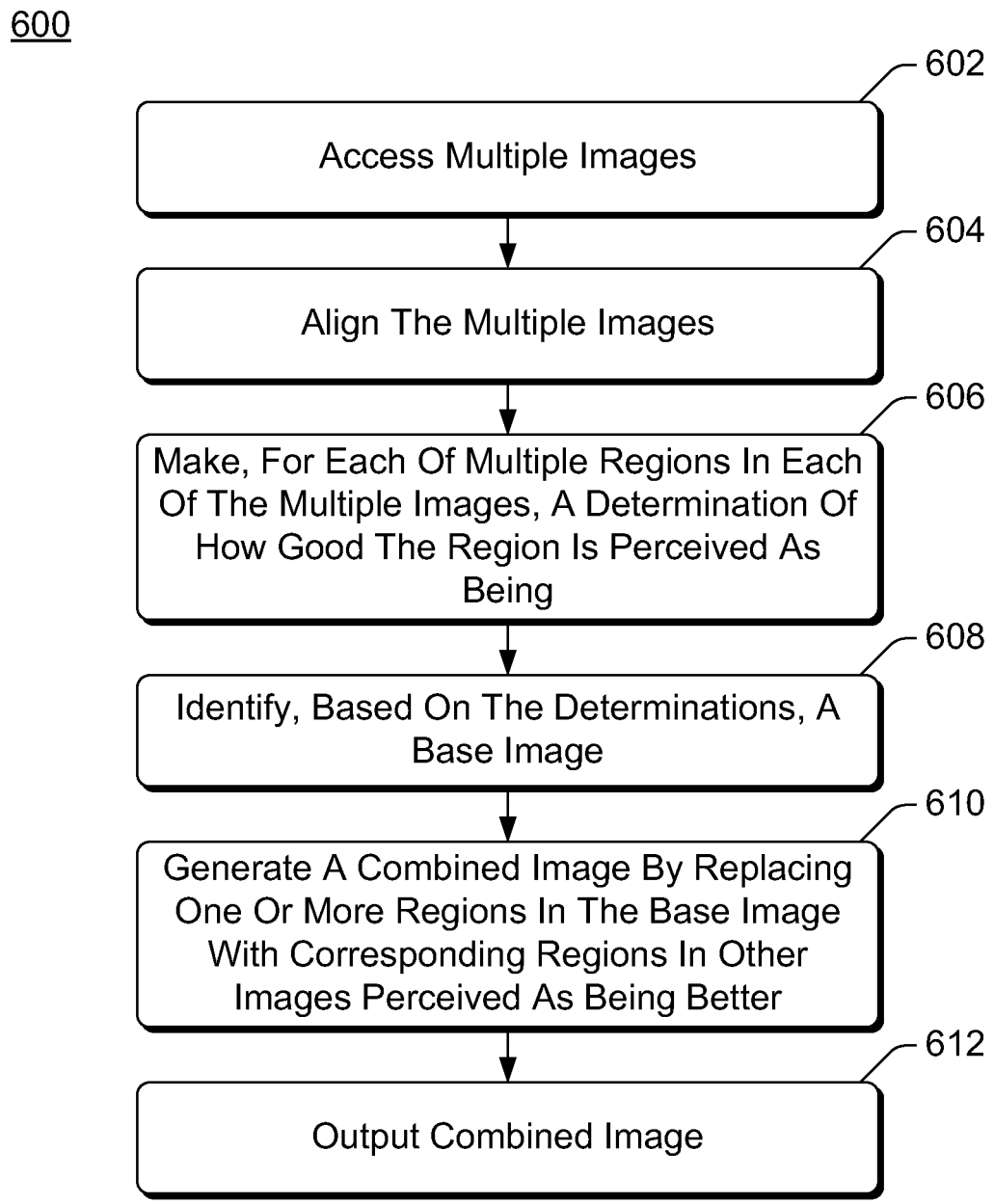
FIG. 6 is a flowchart illustrating an example process for generating a combined image from multiple images in accordance with one or more embodiments.

FIG. 6 is a flowchart illustrating an example process 600 for generating a combined image from multiple images in accordance with one or more embodiments. Process 600 is carried out by a device, such as a device implementing image generation module 102 of FIG. 1, and can be implemented in software, firmware, hardware, or combinations thereof. Process 600 is shown as a set of acts and is not limited to the order shown for performing the operations of the various acts. Process 600 is an example process for generating a combined image from multiple images; additional discussions of generating a combined image from multiple images are included herein with reference to different figures.

In process 600, multiple images are accessed (act 602). These multiple images can be received or obtained in a variety of different manners as discussed above.

The multiple images are aligned (act 604). As part of this aligning, corresponding regions of the multiple images are identified as discussed above. Additionally, if one or more of the multiple images cannot be aligned (e.g., due to their being images of a different scene), then those one or more images are deleted from the multiple images.

For each of multiple regions in each of the multiple images, a determination is made of how good the region is perceived as being (act 606). This determination can be made in a variety of different manners, such as by evaluating one or more of various characteristics of the region and/or based on a learning process as discussed above.

Based on the determinations made in act 606, a base image is identified (act 608). The base image can be identified in different manners, such as selecting the image having the largest image score, selecting the image having the largest number of regions that are perceived as being the "best" regions, and so forth as discussed above.

A combined image is generated by automatically replacing one or more regions in the base image with corresponding regions in other images that are perceived as being better (act 610). These regions that are perceived as better are with corresponding regions having higher scores, having higher ranks, that were determined by a learning process as being the "best", and so forth. As discussed above, the resultant combined image includes, for each region in the base image, the one of the corresponding regions that is perceived as being the "best" region. The one of the corresponding regions that is perceived as being the "best" region can be a region in which an object that is present in one or more corresponding regions of other images of the multiple images is absent as discussed above.

The combined image generated in act 610 is output (act 612). The combined image can be output in a variety of different manners, such as displaying the combined image, storing the combined image in a particular location (e.g., in a file in nonvolatile memory), communicating the combined image to another component or module of the device implementing process 600 (or alternatively of another device), and so forth.

Figure 7:
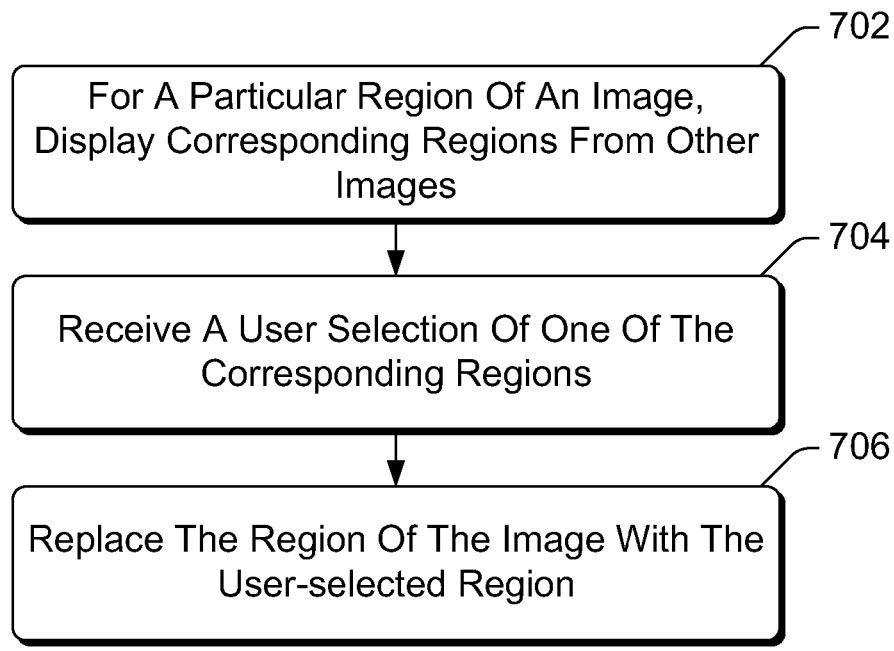
FIG. 7 is a flowchart illustrating an example process for selecting regions to include in the combined image based on user input in accordance with one or more embodiments.

FIG. 7 is a flowchart illustrating an example process 700 for selecting regions to include in the combined image based on user input in accordance with one or more embodiments. Process 700 is carried out by a device, such as a device implementing image generation module 102 of FIG. 1, and can be implemented in software, firmware, hardware, or combinations thereof. Process 700 is shown as a set of acts and is not limited to the order shown for performing the operations of the various acts. Process 700 is an example process for selecting regions to include in the combined image based on user input; additional discussions of selecting regions to include in the combined image based on user input are included herein with reference to different figures.

In process 700, for a particular region of an image, corresponding regions from other images are displayed (act 702). These corresponding images can be displayed in different manners, such as in a window or menu adjacent to the particular region. The image that includes the particular region can be different images, such as a base image from which a combined image is being generated, a combined image after regions from different images have been automatically selected for inclusion in the combined image, and so forth.

A user selection of one of the corresponding regions is received (act 704). This user selection can be received in response to a variety of different user inputs as discussed above.

In response to the user selection in act 704, the particular region of the image is replaced with the user-selected region (act 706). Thus, for example, an automatically selected region can be overridden by a user, and the user-selected region included in the combined image rather than the automatically selected region.

Process 700 can be repeated for multiple different regions of the image.

Additionally, in one or more embodiments the generating a combined image from multiple images techniques discussed herein can be used during an image capturing process. In such embodiments, in addition to generating a combined image, a check is made to ensure that at least one of the corresponding regions is perceived as being good enough. This check can be performed in different manners. For example, a check can be made for whether, for each region in an image, that region or a corresponding region of another image has a score that exceeds a threshold value. This threshold value can be determined in various manners, such as empirically, based on the preferences of the administrator or designer, and so forth. Images continue to be captured until at least one of the corresponding regions is perceived as being good enough.

For example, a digital camera can have a "group shot" feature that can be activated by pressing a particular button, selecting a particular menu option, and so forth. In response to a user request (e.g., pressing a shutter release button) to take a picture with the group shot feature activated, the digital camera begins capturing and analyzing images. The digital camera includes an image generation module (e.g., a module 102 of FIG. 1) that identifies regions in the multiple images and determines how good those regions are perceived as being as discussed above. The digital camera continues to capture images until, for each set of corresponding regions in different images, at least one of the corresponding regions in the different images is perceived as being good enough (e.g., exceeds a threshold value). The digital camera can then cease capturing images because a combined image in which each automatically selected region is perceived as being good enough (e.g., exceeds a threshold value) can be generated. The digital camera can optionally provide feedback, such as a flashing light or audible tone, indicating that the digital camera has ceased capturing images.

Alternatively, the digital camera can cease capturing images in response to other events, such as a threshold number of images having been captured, images having been captured for a particular amount of time, one or more users being detected is no longer detected in the scene being captured, and so forth.

Figure 8:
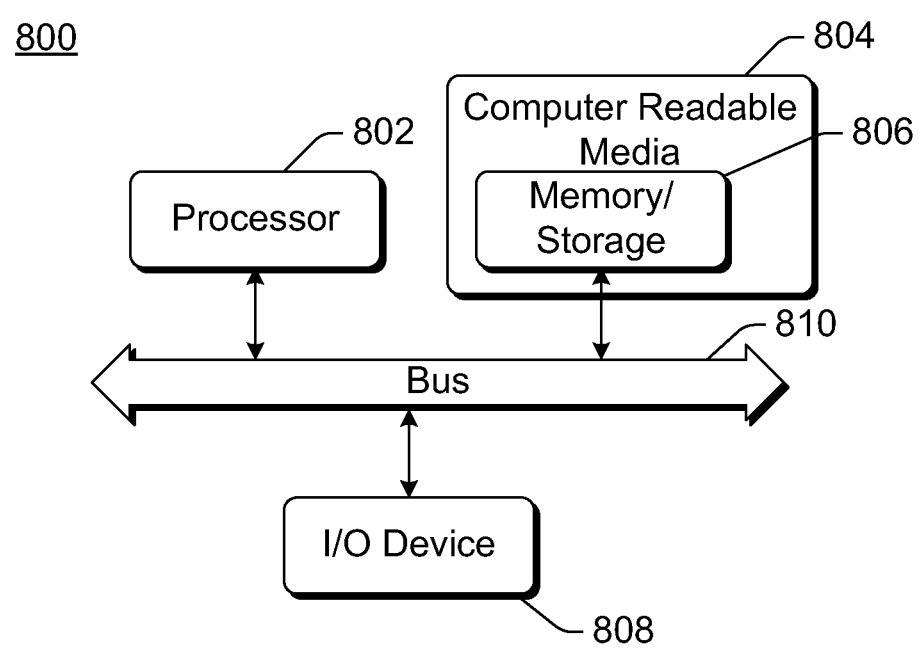
FIG. 8 illustrates an example computing device that can be configured to implement the generating a combined image from multiple images in accordance with one or more embodiments.

FIG. 8 illustrates an example computing device 800 that can be configured to implement the generating a combined image from multiple images in accordance with one or more embodiments. One or more computing devices 800 can be used to implement, for example, service 100 of FIG. 1.

Computing device 800 includes one or more processors or processing units 802, one or more computer readable media 804 which can include one or more memory and/or storage components 806, one or more input/output (I/O) devices 808, and a bus 810 that allows the various components and devices to communicate with one another. Computer readable media 804 and/or one or more I/O devices 808 can be included as part of, or alternatively may be coupled to, computing device 800. Bus 810 represents one or more of several types of bus structures, including a memory bus or memory controller, a peripheral bus, an accelerated graphics port, a processor or local bus, and so forth using a variety of different bus architectures. Bus 810 can include wired and/or wireless buses.

Memory/storage component 806 represents one or more computer storage media. Component 806 can include volatile media (such as random access memory (RAM)) and/or nonvolatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 802. It is to be appreciated that different instructions can be stored in different components of computing device 800, such as in a processing unit 802, in various cache memories of a processing unit 802, in other cache memories of device 800 (not shown), on other computer readable media, and so forth. Additionally, it is to be appreciated that the location where instructions are stored in computing device 800 can change over time.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 8. The features of the generating a combined image from multiple images techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
  accessing multiple images each including multiple objects;
  making a determination, for each of multiple regions in the multiple images, of how good the region is perceived as being by a device; and
  generating a combined image from the multiple images based on the determinations of how good corresponding ones of the multiple regions in the multiple images are perceived as being, the generating including automatically selecting for inclusion in the combined image a region from one of the multiple images in which an object that is present in one or more corresponding regions of other images of the multiple images is absent, the generating further including automatically selecting the region in which the object is absent if the object that is present in the one or more corresponding regions of other images is not identified, based on information in an object database, as a known object.

2. A method as recited in claim 1, wherein making a determination, for each of the multiple regions, of how good the region is perceived as being comprises determining, for each of the multiple regions, a score or rank associated with the region based on one or more characteristics of the region.

3. A method as recited in claim 1, further comprising:
  displaying, for a first region of the combined image, corresponding regions of one or more other images of the multiple images;
  receiving a user selection of one of the corresponding regions of the one or more other images; and replacing the first region of the combined image with the user-selected one of the corresponding regions of the one or more other images.

4. A method as recited in claim 3, wherein displaying the corresponding regions comprises displaying the corresponding regions in a window adjacent to the first region.

5. A method as recited in claim 1, wherein each of the multiple objects comprises a face.

6. A method as recited in claim 1, wherein making the determination of how good the region is perceived as being comprises determining whether an object that has been identified by a user is included in the region, and making the determination for the region based on whether an object that has been identified by the user is included in the region.

7. A method as recited in claim 1, wherein the multiple objects comprise multiple faces, and wherein making the determination of how good the region is perceived as being comprises determining whether eyes are detected as being open in a face in the region, and making the determination for the region based on whether eyes are detected as being open or including a catchlight in the face in the region.

8. A method as recited in claim 1, wherein the multiple objects comprise multiple faces, and wherein making the determination of how good the region is perceived as being comprises determining whether a smile is detected as being present in a face in the region, and making the determination for the region based on whether a smile is detected as being present in the face in the region.

9. A method as recited in claim 1, wherein the device comprises a digital camera that captures the multiple images, the method further comprising continuing to capture images to include in the multiple images until, for each of the multiple regions in an image, the region or a corresponding region of another of the multiple regions has a score that exceeds a threshold value.

10. A method comprising:
accessing multiple images each including multiple objects;
making a determination, for each of multiple regions in the multiple images, of how good the region is perceived as being by a device; and
generating a combined image from the multiple images based on the determinations of how good corresponding ones of the multiple regions in the multiple images are perceived as being, the generating including
automatically selecting for inclusion in the combined image a region from one of the multiple images in which an object that is present in one or more corresponding regions of other images of the multiple images is absent,
identifying a first image of the multiple images to be a base image, and
generating the combined image from the multiple images by automatically replacing each region of the base image with a corresponding region of a second image of the multiple images if the corresponding region of the second image is perceived as being better than the region of the first image.

11. A method as recited in claim 10, wherein the corresponding region of the second image is perceived as being better than the region of the first image if the object is absent from the corresponding region of the second image.

12. A method as recited in claim 10, wherein identifying the first image to be the base image comprises:
determining, for each of the multiple images, how many regions in the image have been determined as being the best; and
selecting, as the base image, the one of the multiple images having a largest number of regions determined as being the best.

13. A method as recited in claim 10, wherein making a determination, for each of the multiple regions, of how good the region is perceived as being comprises determining, for each of the multiple regions, a score or rank associated with the region based on one or more characteristics of the region.

14. A method as recited in claim 10, wherein the device comprises a digital camera that captures the multiple images, the method further comprising continuing to capture images to include in the multiple images until, for each of the multiple regions in an image, the region or a corresponding region of another of the multiple regions has a score that exceeds a threshold value.

15. A method as recited in claim 10, wherein each of the multiple objects comprises a face.

16. One or more computer storage media having stored thereon multiple instructions comprising instructions that, responsive to execution by one or more processors of a computing device, cause the one or more processors to:
access multiple images each including multiple objects;
make a determination, for each of multiple regions in the multiple images, of how good the region is perceived by the computing device as being;
identify a base image of the multiple images;
generate a combined image from the multiple images by automatically replacing each region of the base image with a corresponding region of another image of the multiple images if the corresponding region has been determined as being better than the region of the base image, wherein the corresponding region has been determined as being better than the region of the base image if an object that is included in the region of the base image is absent from the corresponding region;
display regions of each of the other images of the multiple images, each of the displayed regions corresponding to a particular region of the base image;
receive a user selection of one of the corresponding regions of the other images of the multiple images; and
replace the particular region of the base image with the user-selected one of the corresponding regions of the other images.

17. One or more computer storage media as recited in claim 16, wherein to make a determination, for each of the multiple regions, of how good the region is perceived by the computing device as being is to make a determination, for each of the multiple regions, of a score or rank for the region based on one or more characteristics of the region.

18. One or more computer storage media as recited in claim 16, wherein to display the regions of each of the other images is to display the regions of each of the other images in a window adjacent to the particular region.

19. One or more computer storage media as recited in claim 16, wherein each of the multiple objects comprises a face.

20. One or more computer storage media as recited in claim 16, wherein to identify the base image of the multiple images is to:
determine, for each of the multiple images, how many regions in the image have been determined as being the best; and
select, as the base image, the one of the multiple images having a largest number of regions determined as being the best.

* * * * *